(12) United States Patent
Dinh et al.

(10) Patent No.: US 7,193,397 B2
(45) Date of Patent: Mar. 20, 2007

(54) VOLTAGE CONVERTER

(75) Inventors: James S Dinh, Gig Harbor, WA (US); Robert D Wickersham, Roy, WA (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 10/612,299

(22) Filed: Jun. 30, 2003

(65) Prior Publication Data

US 2004/0263135 A1    Dec. 30, 2004

(51) Int. Cl.
*G05F 1/14*   (2006.01)
(52) U.S. Cl. ............... 323/255; 323/264; 323/340; 363/46
(58) Field of Classification Search ............ 323/255, 323/256, 259, 262, 264, 340, 344; 363/21.06, 363/21.14, 45, 46, 47, 48
See application file for complete search history.

(56) References Cited

U.S. PATENT DOCUMENTS

| 5,008,801 | A | * | 4/1991 | Glennon .................. 363/132 |
| 5,795,595 | A | * | 8/1998 | Beeck et al. ............. 425/198 |
| 6,304,460 | B1 |  | 10/2001 | Cuk |
| 6,559,562 | B1 | * | 5/2003 | Rostron .................... 323/255 |

FOREIGN PATENT DOCUMENTS

EP    1300934 A1    4/2003

| WO | WO-05006524 A2 | 1/2005 |
| WO | WO-05006524 A3 | 9/2005 |

OTHER PUBLICATIONS

International Search Report and The Written Opinion of the International Searching Authority, or the Declaration for International Application No. PCT/US2004/019250.

* cited by examiner

*Primary Examiner*—Jessica Han
(74) *Attorney, Agent, or Firm*—Schwegman, Lundberg, Woessner & Kluth, P.A.

(57) ABSTRACT

A voltage converter includes a transformer circuit, a filter, and a controller. The transformer circuit is coupled to the filter, and the controller is coupled to the transformer circuit and the filter. The transformer circuit includes an input port and an autotransformer coupled to the input port. The voltage converter receives an input signal at the input port and generates a transformer output signal from a transformer output port. The filter receives the transformer output signal on a filter input port and the filter generates an output signal at an output port. The controller receives the output signal from the filter and provides one or more control signals to the transformer circuit to control the output signal. A method includes receiving a first input signal on an input port at a transformer circuit including a first coil and a second coil, activating a first switch to serially connect the first coil to the second coil, activating a second switch to connect the second coil to a second input port, deactivating the first switch and the second switch, and activating a third switch to connect the first input signal to the second input port.

28 Claims, 6 Drawing Sheets

VOLTAGE CONVERTER

FIELD

This invention relates to power supply circuits. More particularly, this invention relates to voltage conversion circuits.

BACKGROUND

As integrated circuits, such as microprocessors, become more complex, they generally require power supplies that provide high currents and low well-regulated voltages. Switching power supply circuits that provide high currents and low well-regulated voltages can be constructed. Unfortunately, these circuits are inefficient and require a large number of expensive components, such as power metal-oxide semiconductor field-effect transistors, inductors, and capacitors.

DESCRIPTION

Figure 1A:
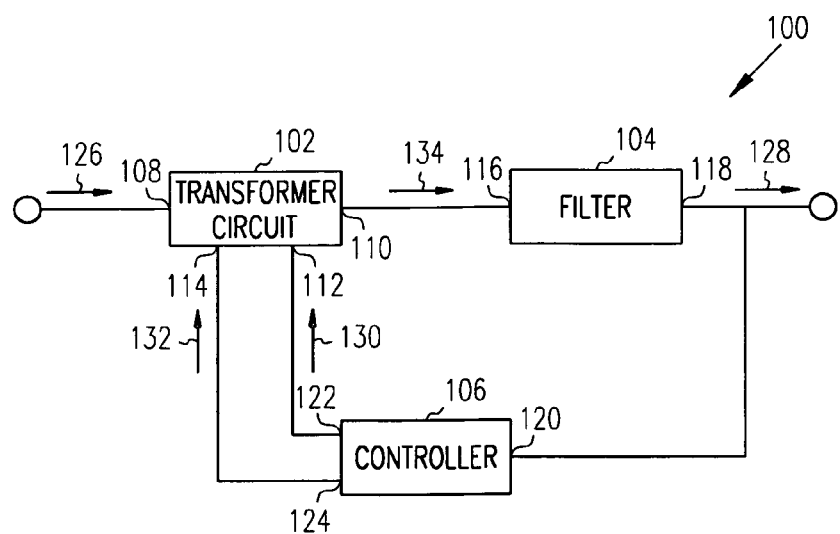
FIG. 1A is a block diagram of a converter including a transformer circuit, a filter, and a controller according to some embodiments of the present invention.

In the following description of some embodiments of the invention, reference is made to the accompanying drawings which form a part hereof, and in which are shown, by way of illustration, specific embodiments of the invention which may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following description is not to be taken in a limiting sense, and the scope of the present invention is defined only by the appended claims, along with the full scope of equivalents to which such claims are entitled.

FIG. 1A is a block diagram of a converter 100 including a transformer circuit 102, a filter 104, and a controller 106 according to some embodiments of the present invention. The transformer circuit 102 includes an input port 108, an output port 110, and control ports 112 and 114. The filter 104 includes an input port 116 and an output port 118. The controller 106 includes an input port 120 and output ports 122 and 124. The output port 110 of the transformer circuit 102 is coupled to the input port 116 of the filter 104. The output port 118 of the filter 104 is coupled to the input port 120 of the controller 106. The output ports 122 and 124 of the controller 106 are coupled to the control ports 112 and 114, respectively, of the transformer circuit 102.

In operation, the converter 100 receives an input signal 126 at the input port 108 of the transformer circuit 102 and provides an output signal 128 at the output port 118 of the filter 104. The controller 106 receives the output signal 128 at the input port 120 and provides control signals 130 and 132 at the output ports 122 and 124. The transformer circuit 102 receives the control signals 130 and 132 at the control ports 112 and 114 and the input signal 126 at the input port 108 and provides the transformer circuit output signal 134 at the output port 110. The filter 104 receives the transformer circuit output signal 134 at the input port 116 and provides the output signal 128 at the output port 118.

Figure 1B:
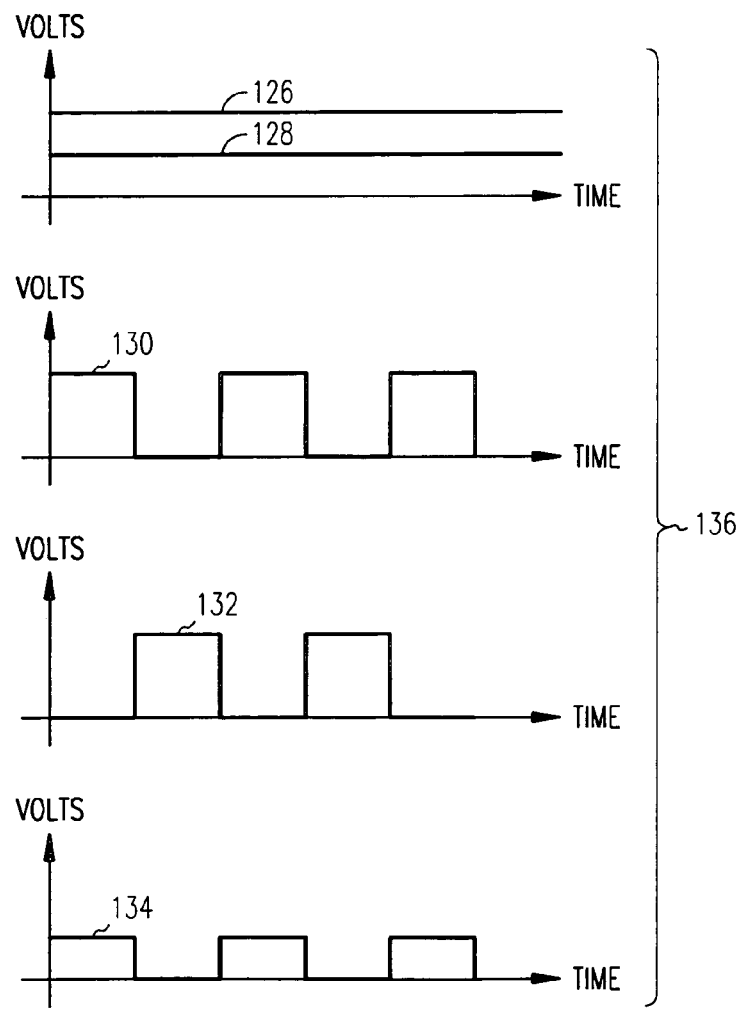
FIG. 1B is a set of timing diagrams showing the input signal, the output signal, the control signals, and the transformer circuit output signal, shown in FIG. 1A, according to some embodiments of the present invention.

FIG. 1B is a set of timing diagrams 136 showing the input signal 126, the output signal 128, the control signals 130 and 132, and the transformer circuit output signal 134, shown in FIG. 1A, according to some embodiments of the present invention. As can be seen in FIG. 1B, the value of the output signal 128 provided by the converter 100 (shown in FIG. 1A) is less than the value of the input signal 126. In addition, the control signals 130 and 132 are complementary signals. When the control signal 130 is high, the control signal 132 is low, and when the control signal 130 is low, the control signal 132 is high. The controller 106 (shown in FIG. 1A) controls the duty cycle of the control signals 130 and 132 to control the output signal 128. The transformer circuit output signal 134 is substantially a square wave. The filter 104 processes the transformer circuit output signal 134 to provide the output signal 128, which is substantially a direct current voltage signal. In some embodiments, the input signal 126 is a substantially direct current voltage signal having a value of about forty-eight volts and the controller 106 modulates the duty cycle of the control signals 130 and 132 such that the output signal 128 is substantially a direct current voltage signal having a value of about six-tenths of a volt.

Figure 2:
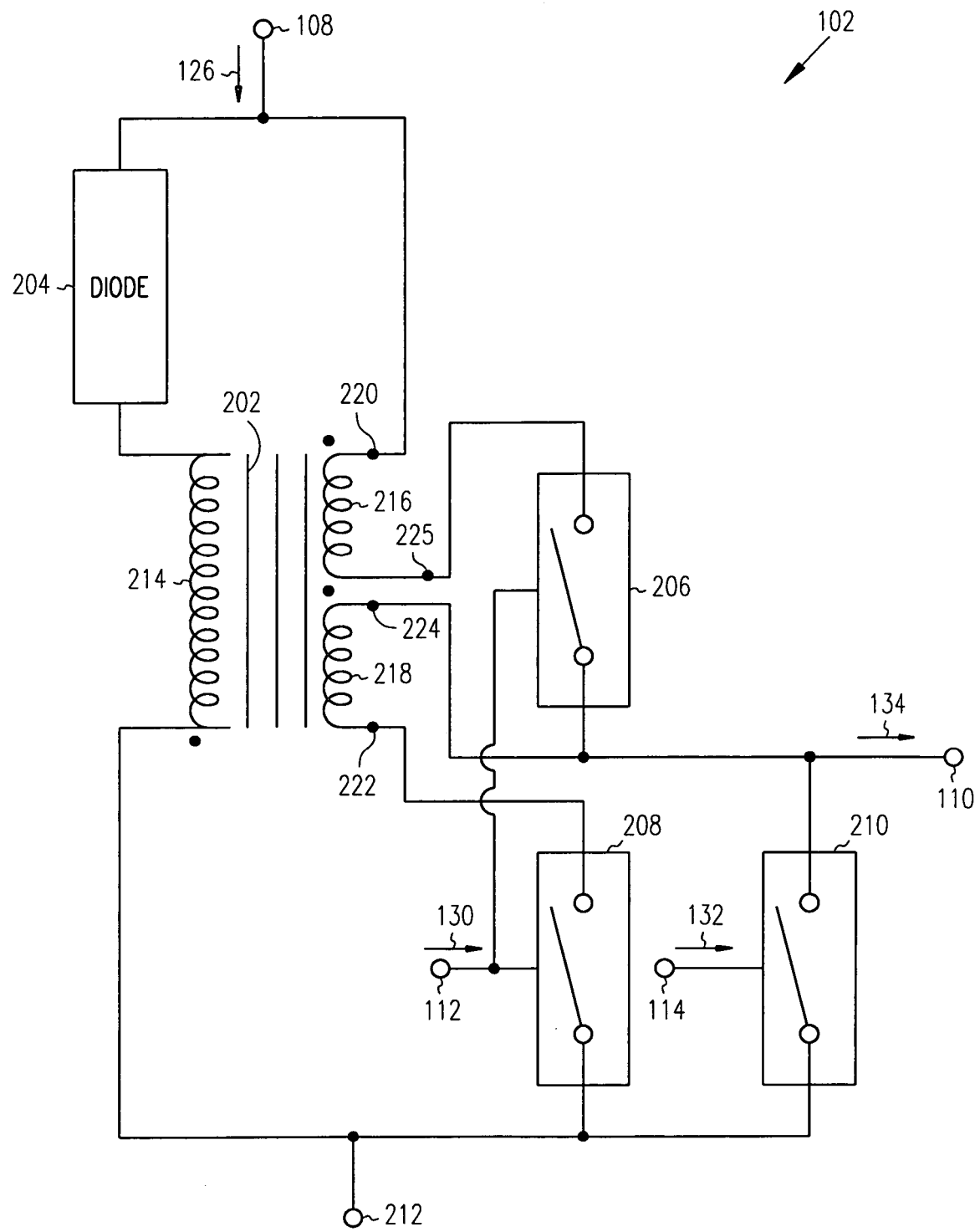
FIG. 2 is a schematic diagram of the transformer circuit, shown in FIG. 1A, according to some embodiments of the present invention.

FIG. 2 is a schematic diagram of the transformer circuit 102, shown in FIG. 1A, according to some embodiments of the present invention. The transformer circuit 102 includes the input port 108, the output port 110, the control ports 112 and 114, an autotransformer 202, a diode 204, switches 206, 208, and 210, and an input port 212. The autotransformer 202 includes coils 214, 216, and 218. The input port 108 is connected in series with the diode 204, the coil 214, and the input port 212. The input port 108 is also connected in series with the coil 216, the switch 206, the coil 218, the switch 208, and the input port 212. The switch 210 is connected between the output port 110 and the input port 212. The switch 210 is connected in parallel with the coil 218 and the switch 208.

The autotransformer 202 is not limited to a particular type of autotransformer. An autotransformer is a transformer in which the primary and secondary coils have all or part of their turns in common. The coil 216 in series with the coil 218 extends from node 220 to node 222 and includes all of the turns for the coil 218 extending from node 222 to 224. The autotransformer 202 also includes the coil 214 as a secondary coil to the coils 216 and 218. The use of the autotransformer 202 obviates the need for rectification of the output voltage and the component costs associated with rectification. In addition, the use of the autotransformer 202 provides an efficient converter 100 (shown in FIG. 1A) because the switched currents or voltages are low, lowering switching losses.

The diode 204 is not limited to a particular type of diode. The diode 204 is selected to meet the circuit requirement for reset current.

The switches 206, 208, and 210 are not limited to a particular type of switch. Exemplary types of switches suitable for use in connection with the fabrication of the converter 100 (shown in FIG. 1A) include transistors, such as insulated gate metal-oxide semiconductor field-effect transistors, bipolar junction transistors, and insulated-gate bipolar transistors. The transistors are sized to handle the current generated in the converter 100. For example, if the autotransformer 202 has a maximum current of 100 amperes in the coil 216 during the operation of the converter 100, then the transistors used for the switches 206 and 208 are sized to handle at least 100 amperes.

In operation, the input port 212 is set to a potential, such as a zero or ground potential, and the transformer circuit 102 receives the input signal 126 (shown in FIG. 1B) at the input port 108, the control signals 130 (shown in FIG. 1B) and 132 (shown in FIG. 1B) at the control ports 112 and 114, respectively, and provides the transformer circuit output signal 134 (shown in FIG. 1B) at the output port 110. During the first part of one cycle of operation, the switches 206 and 208 are closed and the switch 210 is open. With the switches 206 and 208 closed, a conductive path is formed between the input port 108 and the input port 212. The input signal 126 is stepped-down by the ratio of the coils 216 and 218 of the autotransformer 202, and the stepped signal is provided as the transformer circuit output signal 134 at the output port 110. The autotransformer 202 includes a node 225. The voltage at the node 225 will rise rapidly after the switch 206 turns off. By sensing this voltage level it can be determined when to turn off the switch 208 and to turn on the switch 210. During the second part of one cycle of operation, the switches 206 and 208 are open and the switch 210 is closed. With the switches 206 and 208 open and the switch 210 closed, the output port 110 is pulled to the potential provided at the input port 212, and a voltage is induced (from the flux drop in the transformer after the opening of the switches 206 and 208) in the coil 214. A current (not shown) flows in the diode 204 and the source (not shown) that provides the input signal 126 at the input port 108. In some embodiments, the diode 204 is connected to a port (not shown) other than the input port 108, and the induced current flows to the source connected to that port.

The operation described above provides for efficient voltage conversion. The current through the switch 206 is low and the voltage across the switches 208 and 210 is low, so the power switched is low and the conversion efficiency is high. The efficiency is also increased because the current in the coil 216 flows into the filter 104 (shown in FIG. 1A).

Figure 3:
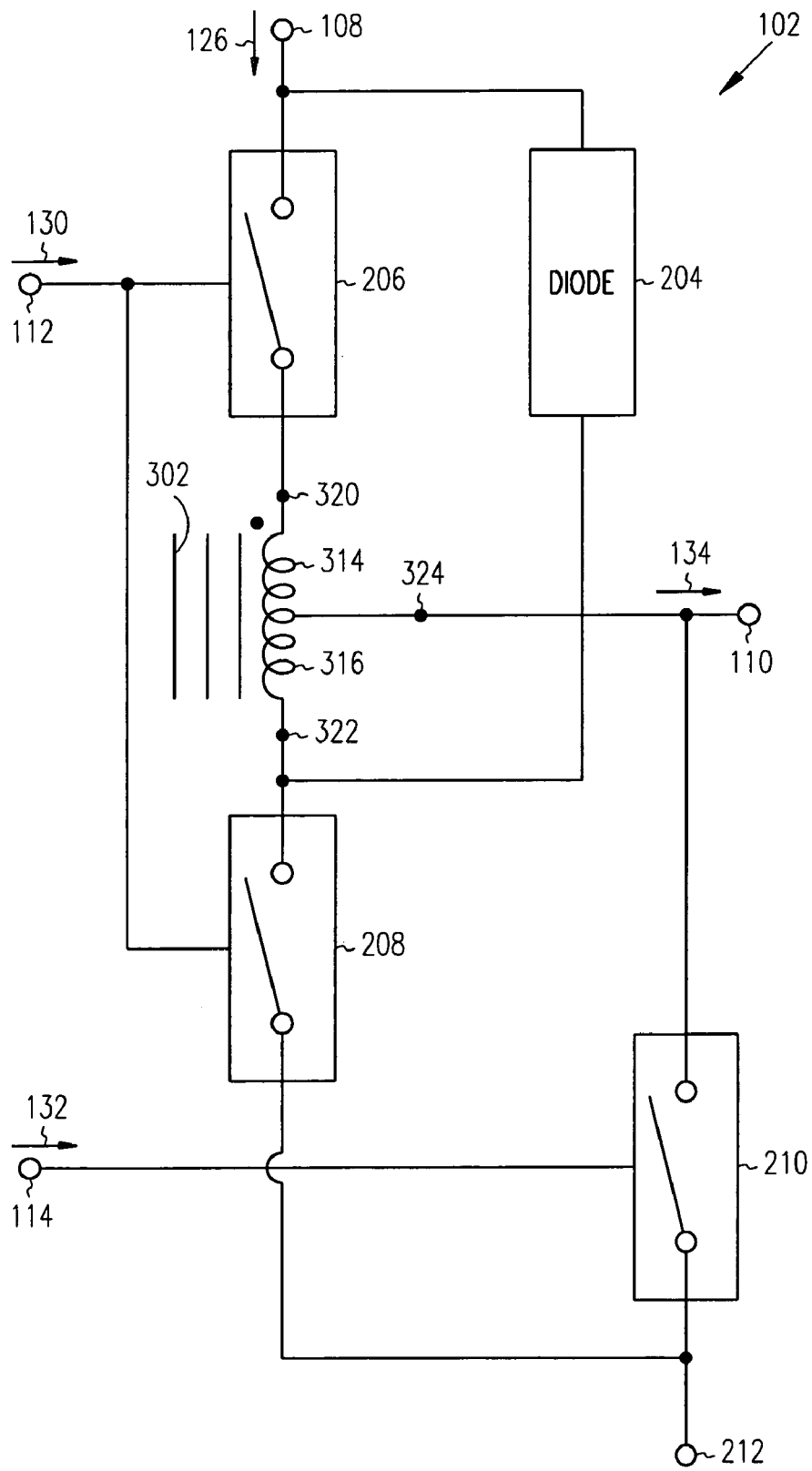
FIG. 3 is a schematic diagram an alternative embodiment of the transformer circuit, shown in FIG. 1A, according to some embodiments of the present invention.

FIG. 3 is a schematic diagram of an alternative embodiment of the transformer circuit 102, shown in FIG. 1A, according to some embodiments of the present invention. The transformer circuit 102 includes the input port 108, the output port 110, the control ports 112 and 114, an autotransformer 302, a diode 204, switches 206, 208, and 210, and an input port 212. The autotransformer 302 includes coils 314 and 316. The input port 108 is connected in series with the switch 206, the autotransformer 302, and the switch 208, and the input port 212. The diode 204 is connected in parallel with the switch 206 and the autotransformer 302. The switch 210 is connected between the output port 110 of the autotransformer 302 and the input port 212.

The autotransformer 302 is not limited to a particular type of autotransformer. The coil 314 and the coil 316 extend from node 320 to node 322 and include all of the turns for the coil 316 that extends from node 322 to 324. The description provided above for the diode 204 and the switches 206, 208, and 210 in FIG. 2 applies to the diode 204 and the switches 206, 208, and 210 shown in FIG. 3.

In operation, the input port 212 is set to a potential, such as a zero or ground potential, and the transformer circuit 102 receives the input signal 126 (shown in FIG. 1B) at the input port 108, the control signals 130 (shown in FIG. 1B) and 132 (shown in FIG. 1B) at the control ports 112 and 114, respectively, and provides the transformer circuit output signal 134 (shown in FIG. 1B) at the output port 110. During the first part of one cycle of operation, the switches 206 and 208 are closed and the switch 210 is open. With the switches 206 and 208 closed, a conductive path is formed between the input port 108 and the input port 212. The input signal 126 is stepped by the ratio of the coils 314 and 316 of the autotransformer 302, and the stepped signal is provided as the transformer circuit output signal 134 at the output port 110. During the second part of one cycle of operation, the switches 206 and 208 are open and the switch 210 is closed. With the switches 206 and 208 open and the switch 210 closed, the output port 110 is pulled to the potential provided at the input port 212, and a current (not shown) flows in the diode 204 to the source (not shown) that provides the input signal 126 at the input port 108. In some embodiments, the diode 204 is connected to a port (not shown) other than the input port 108, and the current flows to the source connected to that port.

The operation described above provides for efficient voltage conversion. The current through the switch 206 is low and the voltage across the switches 208 and 210 is low, so the power switched is low and the conversion efficiency is high. In addition, flux build-up in the core of the autotransformer 302 is avoided and conversion efficiency is improved by providing the conductive path from the node 322 of the autotransformer 302 through the diode 204 to the source of the input signal 126.

Figure 4:
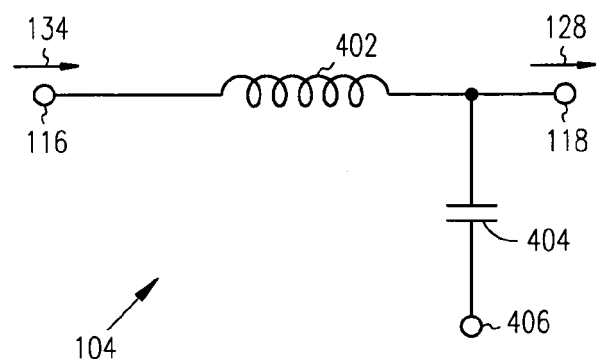
FIG. 4 is a schematic diagram of the filter, shown in FIG. 1A, according to some embodiments of the present invention.

FIG. 4 is a schematic diagram of the filter 104, shown in FIG. 1A, according to some embodiments of the present invention. The filter 104 is a low-pass filter and includes the input port 116, the output port 118, an inductor 402, a capacitor 404, and an input port 406. The inductor 402 is connected between the input port 116 and the output port 118. The capacitor 404 is connected between the output port 118 and the input port 406.

The inductor 402 is not limited to a particular type of inductor. Any coiled conductor capable of storing energy is suitable for use in connection with the fabrication of the inductor 402 in the filter 104. The inductor 402 does not require a "high flux" density, so a low cost inductor can be used. In some embodiments, the inductor 402 includes a core. The core can be formed from a low-loss magnetic material. Exemplary magnetic materials suitable for use in connection with the fabrication of the core include molypermalloy and ferrites. The inductor 402 is not limited to an inductor having a particular inductance. In some embodiments, the inductor 402 has an inductance of between about one and about five nano-henrys.

The capacitor 404 is not limited to a particular type of capacitor. Any two plates or conductors separated by a dielectric or insulator that is capable of storing energy in an electric field is suitable for use in connection with the fabrication of the capacitor 404. In some embodiments, the capacitor 404 is a multi-layer ceramic capacitor.

In operation, the input port 406 is set to a potential, such as a zero or ground potential, and the filter 104 receives the transformer circuit output signal 134 (shown in FIG. 1B) at the input port 116 and provides the output signal 128 (shown in FIG. 1B) at the output port 118. In some embodiments, the input port 406 is coupled to the input port 212 (shown in FIG. 2 and FIG. 3). The filter 104 applies a low-pass filter function to the transformer circuit output signal 134 to generate the output signal 128. An increase in efficiency is obtained by connecting the coil 218 (shown in FIG. 2) directly to the input port 116 at the inductor 402 (shown in FIG. 4). In addition, the primary current in the autotransformer is included in the transformer circuit output signal 134.

Referring again to FIG. 1A, in operation, the controller 106 receives the output signal 128 from the filter 104 and provides the control signals 130 and 132 to the transformer circuit 102. If the controller 106 determines that the output signal 128 is less than the control value, then the "on" time for the control signal 130 is increased to provide power from the transformer circuit 102 (shown in FIG. 1A) to the filter 104 (shown in FIG. 1A). If the controller 106 determines that the output signal 128 is greater than the controlled value, then the "on" time for the control signal 130 is decreased to force the current to free wheel around the path including the filter 104 and the switch 210 (shown in FIG. 2). A controller that operates as described is sometimes referred to as a synchronous buck controller. In some embodiments, the controller 106 is a synchronous buck controller. Thus, in some embodiments, the converter 100 (shown in FIG. 1A) utilizes an autotransformer to provide the efficient turns ratio voltage reduction of a transformer while being driven by a synchronous buck controller.

Figure 5:
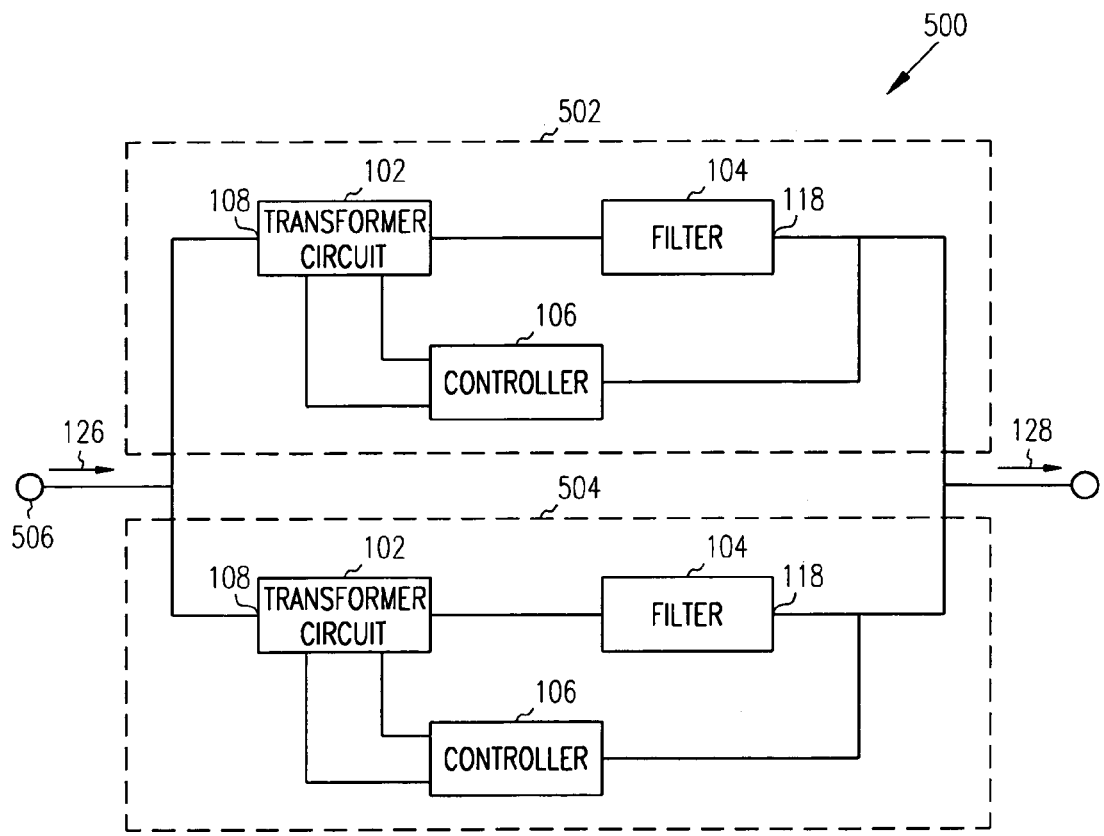
FIG. 5 is a block diagram of a multi-phase converter including a first converter and a second converter according to some embodiments of the present invention.

FIG. 5 is a block diagram of a multi-phase converter 500 including a first converter 502 and a second converter 504 according to some embodiments of the present invention. The first converter 502 includes the transformer circuit 102, the controller 106, coupled to the filter 104 configured as the converter 100 shown in FIG. 1A. The second converter 504 includes the transformer circuit 102, the controller 106, and the filter 104 also configured as the converter 100 shown in FIG. 1A. The input port 506 of the multi-phase converter 500 is coupled to the input port 108 of the transformer circuit 102 of the first converter 502 and to the input port 108 of the transformer circuit 102 of the second converter 504. The output port 508 of the multi-phase converter 500 is coupled to the output port 118 of the filter 104 of the first converter 502 and to the output port 118 of the filter 104 of the second converter 504. FIG. 5 shows only two converters, but the configuration is not limited to two converters. Any number of converters can by connected in parallel and operated as a multi-phase converter. FIG. 5 shows two separate controllers, but the configuration is not limited to two separate controllers. In some embodiments, the multiphase controller 500 includes only one controller.

In operation, the multi-phase converter 500 receives the input signal 126 (shown in FIG. 1B) at the input port 506 and generates the output signal 128 (shown in FIG. 1B) at the output port 508. The first converter 502 is operated 180 degrees out-of-phase from the second converter 504. For n converters, each converter is operated 360/n degrees out-of-phase from the neighboring converters. The multi-phase converter 500 is not limited to the described phase relation between the first converter 502 and the second converter 504. Those skilled in the art will appreciate that other phase relationships can be applied in the operation of the multi-phase converter 500.

Figure 6:
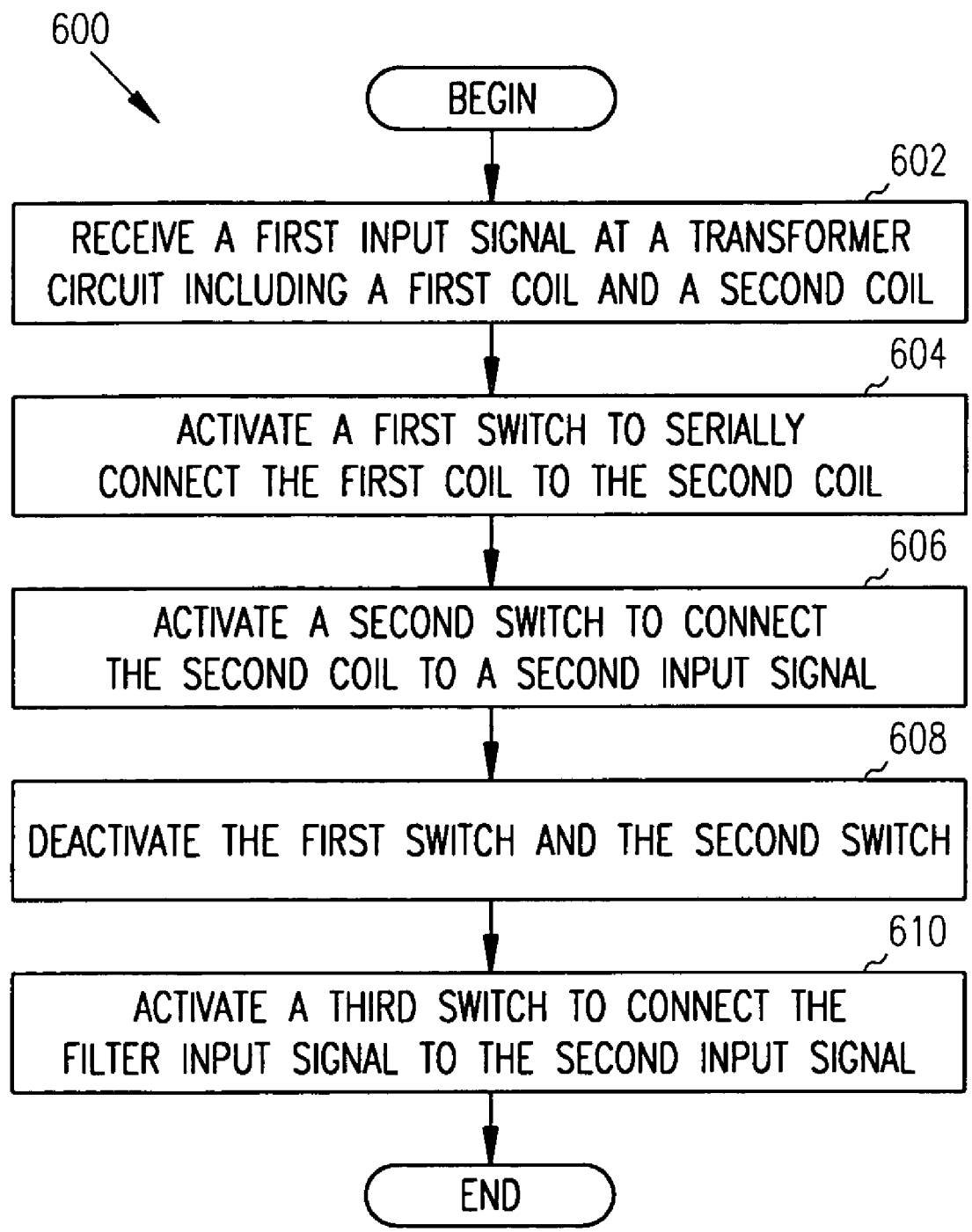
FIG. 6 is a flow diagram of a method for converting the input signal, shown in FIG. 1A, to the output signal, shown in FIG. 1A, according to some embodiments of the present invention.

FIG. 6 is a flow diagram of a method 600 for converting the input signal 126, shown in FIG. 1A, to the output signal 128, shown in FIG. 1A, according to some embodiments of the present invention. The method 600 includes receiving a first input signal at a transformer circuit including a first coil and a second coil (block 602), activating a first switch to serially connect the first coil to the second coil (block 604), activating a second switch to connect the second coil to a second input signal (block 606), deactivating the first switch and the second switch (block 608), and activating a third switch to connect the filter input signal to the second input signal (block 610). In some embodiments, receiving the first input signal at the transformer circuit including a first coil and a second coil includes receiving a substantially direct current voltage signal from a power source. In some embodiments, activating the first switch to serially connect the first coil to the second coil comprises activating the first switch from a first control signal provided by a controller. In some embodiments, activating the second switch to connect the second coil to the second signal comprises activating the second switch from the first control signal. In some embodiments, deactivating the first switch and the second switch comprises deactivating the first switch before deactivating the second switch. In some embodiments, activating the third switch to connect the third switch to the second control signal comprises activating the third switch after deactivating the first switch and the second switch. In still other alternative embodiments, the method further includes connecting the filter input signal to a filter having an output signal and connecting a converter to the output signal.

Figure 7:
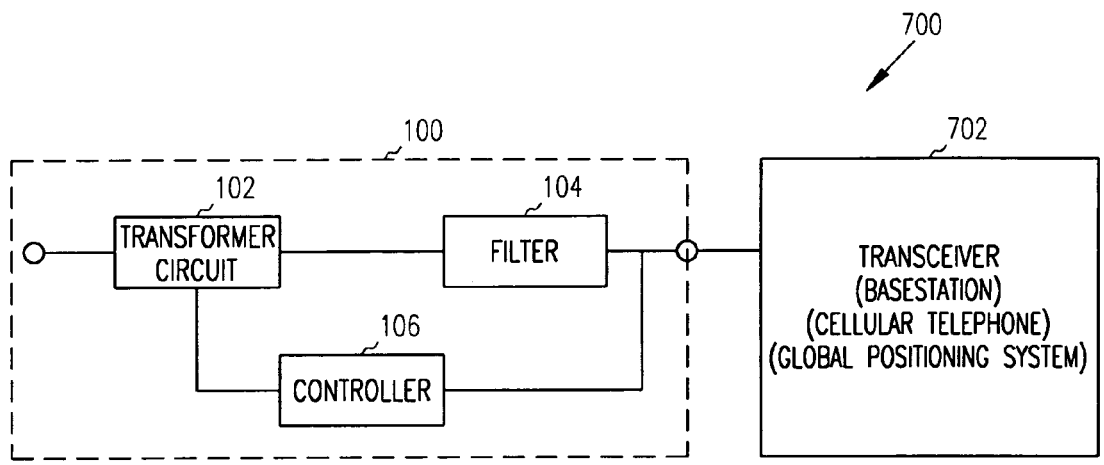
FIG. 7 is a block diagram of a communication system, including the converter, shown in FIG. 1A, coupled to a transceiver according to some embodiments of the present invention.

FIG. 7 is a block diagram of a communication system 700, including the converter 100, shown in FIG. 1A, coupled to a transceiver 702 according to some embodiments of the present invention. The converter 100 includes the transformer circuit 102, the filter 104, and the controller 106 as shown in FIG. 1A and described above. The converter 100 provides power to the transceiver 702. The embodiments of the transformer circuit 102, shown in FIG. 2 and FIG. 3, are each suitable for use in connection with the fabrication of the converter 100 in the communications system 700. The transceiver 702 includes any device capable of transmitting and receiving signals. The signals are not limited to a particular type of signal, a particular communications protocol, or a particular signal power level. Exemplary devices capable of transmitting and receiving signals and functioning as transceivers include base stations for cellular communications systems, cellular telephones, and global positioning systems.

Figure 8:
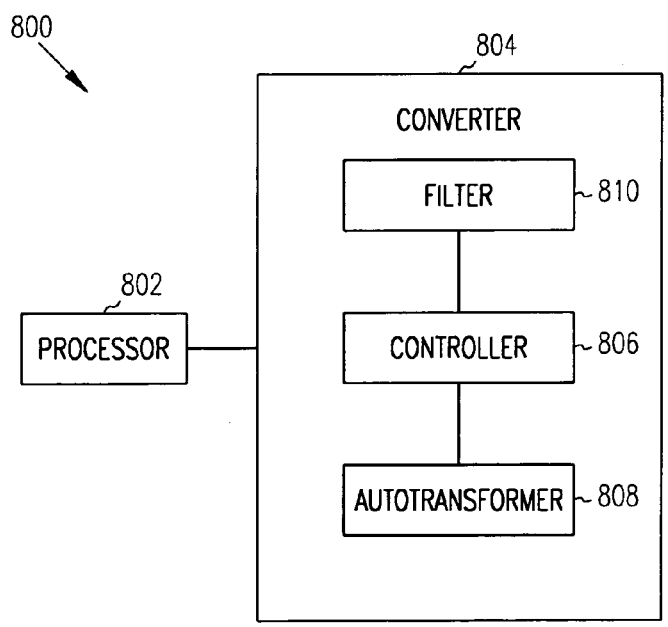
FIG. 8 is a block diagram of a computer system including a processor coupled to a converter according to some embodiments of the present invention.

FIG. 8 is a block diagram of a computer system 800 including a processor 802 coupled to a converter 804 according to some embodiments of the present invention. The converter 804 includes a controller 806 coupled to an autotransformer 808 and a filter 810. In some embodiments, the controller 806 is a synchronous buck controller. The converter 804 provides power to the processor 802. In some embodiments, the converter 804 is the converter 100 (shown in FIG. 1A). In other embodiments the converter 804 is a multi-phase converter 500 (shown in FIG. 5). The processor 802 is not limited to a particular type of processor. In some embodiments, the processor is a complex instruction set processor. In other embodiments, the processor is a very-long instruction word processor.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. A converter comprising:
a transformer circuit including an input port, the transformer circuit including an autotransformer coupled to the input port, the input port to receive a first direct current voltage signal, the transformer circuit to generate a square wave signal at a transformer circuit output;
a filter coupled to the transformer circuit output, the filter to receive the square wave signal and to generate a second direct current voltage signal at an output port of the filter; and
a controller coupled to the transformer circuit and the filter, the controller to receive the second direct current voltage signal from the filter and to provide one or more control signals to the transformer circuit to control the second direct current voltage signal.

2. The converter of claim 1, wherein the autotransformer comprises three coils.

3. The converter of claim 2, wherein a diode is connected between one of the three coils the input port.

4. The converter of claim 3, wherein the filter includes an inductor coupled directly to the autotransformer.

5. The converter of claim 4, wherein the filter comprises a low-pass filter.

6. The converter of claim 4, wherein the controller comprises a synchronous buck controller.

7. A converter comprising:
a transformer circuit including an input port, the transformer circuit including an autotransformer coupled to the input port, the input port to receive a direct current voltage signal, the transformer circuit to generate a square wave signal at a transformer circuit output, wherein the autotransformer comprises no more than two coils, the two coils having all or part of their turns in common;
a filter coupled to the transformer circuit output, the filter to generate an output signal at an output port; and
a controller coupled to the transformer circuit and the filter, the controller to receive the output signal from the filter and to provide one or more control signals to the transformer circuit to control the output signal.

8. The converter of claim 7, wherein the input port is connected in series with a switch and the autotransformer, and a diode is connected in parallel with the switch and the autotransformer.

9. The converter of claim 8, wherein the switch comprises an insulated gate metal-oxide semiconductor field-effect transistor.

10. The converter of claim 9, wherein the controller comprises a synchronous buck controller.

11. The converter of claim 1, wherein the first direct current voltage signal has an input signal value and the second direct current voltage signal has an output signal value and the output signal value is less than the input signal value.

12. The converter of claim 11, wherein the input signal value is about forty-eight volts and the output signal value is about six-tenths of a volt.

13. The converter of claim 1, wherein the converter further comprises a second converter coupled to the output signal.

14. The converter of claim 13, where the second converter is operated 180 degrees out of phase from the converter.

15. A method comprising:
receiving a first input signal at a transformer circuit including a first coil and a second coil;
activating a first switch to serially connect the first coil to the second coil;
activating a second switch to connect the second coil to a second input signal;
deactivating the first switch and the second switch; and
activating a third switch to connect a filter input signal to the second input signal.

16. The method of claim 15, wherein receiving the first input signal at the transformer circuit including a first coil and a second coil comprises receiving a substantially direct current voltage signal from a power source.

17. The method of claim 15, wherein activating the first switch to serially connect the first coil to the second coil comprises activating the first switch from a first control signal provided by a controller.

18. The method of claim 17, wherein activating the second switch to connect the second coil to the second signal comprises activating the second switch from the first control signal.

19. The method of claim 15, wherein deactivating the first switch and the second switch comprises deactivating the first switch before deactivating the second switch.

20. The method of claim 19, wherein activating the third switch to connect the third switch to the second control signal comprises activating the third switch after deactivating the first switch and the second switch.

21. The method of claim 15, further comprising connecting the filter input signal to a filter having an output signal and connecting a controller to the output signal.

22. The converter of claim 1, wherein the transformer circuit includes a switch to couple the transformer circuit output to a ground potential.

23. The converter of claim 7, wherein the transformer circuit includes a switch to couple a transformer circuit output port to a ground potential.

24. The converter of claim 7, wherein the direct current voltage signal has an input signal value and the output signal has an output signal value and the output signal value is less than the input signal value.

25. The converter of claim 24, wherein the input signal value is about forty-eight volts and the output signal value is about six-tenths of a volt.

26. The converter of claim 7, wherein the converter further comprises a second converter coupled to the output signal.

27. The converter of claim 26, where the second converter is operated 180 degrees out of phase from the converter.

28. The converter of claim 7, wherein the output signal is a second direct current voltage signal.

* * * * *